(12) United States Patent
Iwasaki et al.

(10) Patent No.: US 7,147,913 B2
(45) Date of Patent: *Dec. 12, 2006

(54) DISPLAY STRIP

(75) Inventors: Yoshio Iwasaki, Shiga (JP); Yukio Nakagawa, Shiga (JP); Tadao Oota, Kyoto (JP); Naoji Ichise, Kyoto (JP)

(73) Assignee: Ishida Co. Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/753,087

(22) Filed: Jan. 7, 2004

(65) Prior Publication Data
US 2004/0197577 A1 Oct. 7, 2004

Related U.S. Application Data

(63) Continuation-in-part of application No. 10/430,352, filed on May 6, 2003.

(30) Foreign Application Priority Data

| Aug. 30, 2002 | (JP) | ............................. 2002-254972 |
| Nov. 1, 2002 | (JP) | ............................. 2002-320167 |
| Dec. 26, 2002 | (JP) | ............................. 2002-377790 |

(51) Int. Cl.
*B32B 27/08* (2006.01)
*B32B 27/10* (2006.01)
*B32B 27/18* (2006.01)
*B32B 27/32* (2006.01)
*B32B 27/36* (2006.01)

(52) U.S. Cl. .................... 428/349; 428/40.1; 428/41.3; 428/42.2; 428/42.3; 428/343; 428/346; 428/347; 428/355 EN; 428/355 AC; 428/461; 428/483; 428/507; 428/511; 428/514; 428/515; 428/516; 428/520; 428/522; 428/523; 525/222; 525/232; 524/518; 524/523; 524/524; 283/101; 206/466

(58) Field of Classification Search .................... None
See application file for complete search history.

(56) References Cited

U.S. PATENT DOCUMENTS

| 3,029,939 A | 4/1962 | Feldman ...................... 206/80 |
| 3,864,895 A | 2/1975 | Petrea |
| 4,013,188 A * | 3/1977 | Ray ............................ 215/347 |
| 4,337,862 A | 7/1982 | Suter .......................... 206/632 |

(Continued)

FOREIGN PATENT DOCUMENTS

EP 000444865 A2 9/1991

(Continued)

OTHER PUBLICATIONS

Schimtz, Peter et al., "Films." Ullmann's Encyclopedia of Industrial Chemistry, 5th Ed., vol. A11(1988), pp. 85-95, 108-110.*

(Continued)

*Primary Examiner*—Vivian Chen
(74) *Attorney, Agent, or Firm*—Hogan & Hartson LLP

(57) ABSTRACT

The present invention relates to a display strip to hold commodity-containing bags. It can facilitate to make a process of attaching the bags thereto automate. It enables commodity-containing bags to be removed therefrom without having their appearance degraded. The display strip according to the present invention is utilized to hold and align a plurality of commodity-containing bags vertically for the display. It comprises at least a substrate layer and a sealant layer with the sealant layer containing an ethylene-vinyl acetate copolymer and an adhesive promoting tackifier.

20 Claims, 7 Drawing Sheets

U.S. PATENT DOCUMENTS

| | | | | |
|---|---|---|---|---|
| 4,629,639 | A | * 12/1986 | Lucas | 428/35.5 |
| 5,120,781 | A | * 6/1992 | Johnson, Jr. | 524/274 |
| 5,145,737 | A | 9/1992 | Boiron et al. | 428/334 |
| 5,366,777 | A | * 11/1994 | Bown et al. | 428/43 |
| 5,433,060 | A | * 7/1995 | Gur et al. | 53/413 |
| 5,919,863 | A | * 7/1999 | Seppanen et al. | 525/85 |
| 6,221,448 | B1 | * 4/2001 | Baetzold et al. | 428/35.2 |
| 6,481,184 | B1 | * 11/2002 | Junker et al. | 53/413 |
| 6,502,986 | B1 | 1/2003 | Bensur et al. | 383/211 |
| 6,960,635 | B1 | 11/2005 | Stevens et al. | 526/161 |
| 2003/0113519 | A1 | * 6/2003 | Wasserman et al. | 428/195 |
| 2004/0040919 | A1 | * 3/2004 | Iwasaki et al. | 211/71.01 |
| 2004/0043175 | A1 | * 3/2004 | Iwasaki et al. | 428/40.1 |
| 2004/0197514 | A1 | * 10/2004 | Iwasaki et al. | 428/40.1 |
| 2004/0197577 | A1 | * 10/2004 | Iwasaki et al. | 428/457 |
| 2005/0123749 | A1 | 6/2005 | Iwasaki | 428/348 |

FOREIGN PATENT DOCUMENTS

| | | | |
|---|---|---|---|
| EP | 0 742 772 | * 6/1999 | |
| EP | 0 942 055 | 9/1999 | |
| EP | 0 989 162 | 3/2000 | |
| EP | 1 167 220 | 1/2002 | |
| JP | 47042226 Y1 | 12/1972 | |
| JP | 62251327 | 11/1987 | |
| JP | 63132051 | 6/1988 | |
| JP | 01179235 A | 7/1989 | 7/125 |
| JP | 3-69461 | 7/1991 | |
| JP | 03-200562 | 9/1991 | |
| JP | 04001151 | 1/1992 | |
| JP | 04-115946 | 4/1992 | |
| JP | 7-289398 | 11/1995 | |
| JP | 08-276966 | 10/1996 | |
| JP | 10-80345 | 3/1998 | |
| JP | 10-202801 | 8/1998 | |
| JP | 10237405 A | 8/1998 | 123/8 |
| JP | 10-230971 | 9/1998 | |
| JP | 11148054 A | 2/1999 | 7/2 |
| JP | 2000-129234 | 5/2000 | |
| JP | 2000-142650 | 5/2000 | |
| JP | 2000-219789 | 8/2000 | |
| JP | 2001-315836 | 11/2001 | |
| JP | 2002-37279 | 2/2002 | |
| JP | 2005/120175 A2 | 12/2005 | |
| WO | 98/52823 | 11/1998 | |

OTHER PUBLICATIONS

Schimtz, Peter, et al., "Films." Ullman's Encyclopedia of Industrial Chemistry, 5th Ed., vol. A11 (1988), pp. 85-95, 108-110.

* cited by examiner a b a' b' a b

DISPLAY STRIP

This application is a continuation-in-part application of application Ser. No. 10/430,352, filed May 6, 2003, which application is hereby incorporated by reference in its entirety.

TECHNICAL FIELD

The present invention relates to a display strip for holding and aligning a plurality of commodity-containing bags vertically for the display.

BACKGROUND ART

In general, commodities such as snack cookies and the like are packaged in bags using a pillow packaging method (vertical pillows and lateral pillows), and sold. In most cases, the commodities-containing bags are aligned on showcase shelves in stores, and sold. However, in this method, these bags need to be manually placed on showcase shelves bag by bag, and the disadvantage of this method is that the bags are only displayed on predetermined showcase shelves, and consequently have a limitation in places to be displayed.

A displaying and sales method that requires no display shelves, referred to as a strip bag display, has been known. The strip bag display has a display state in which, as shown in FIG. 1, a plurality of commodities are attached to a tape member that has a predetermined width and referred to as a display strip, and hanged down from this. This display state makes it possible to display and sell these commodities in various places such as sides of a register at a shop and sides of a front counter at a hotel, without the necessity of display shelves.

With respect to the conventional display strip, for example, an arrangement was used in which punching processes are applied to predetermined positions of a tape made of a paper or a resin, and an adhesion tape is attached to the rear face thereof so that commodity-containing bags are bonded to the adhesion tape by the punch holes. In addition to this arrangement, for example, another arrangement was used in which resin-made hooks are preliminarily attached to predetermined positions of a tape made of a paper or a resin, and punch holes are opened on the commodities-containing bags so that the commodities are hooked at the corresponding position, and attached thereto.

However, the problem with these display strips is that it is difficult to automatically carry out the attaching process of the commodity-containing bags to the display strip by using a machine. Consequently, at present, the strip bag displaying method has not been widely used.

Here, a display strip has been proposed in which a heat seal layer is formed on one side face so that commodity-containing bags can be directly heat sealed, and bonded thereto. The application of this display strip makes it possible to easily automate the sequence of processes for attaching the commodities-containing bags to a display strip and for packaging the commodities into the bags continuously.

Upon attaching the commodities-containing bags to this display strip, it is necessary to bond these with a sufficient sealing strength so that the bags should not drop naturally by gravity upon attaching the commodities-containing bags to the display strip at a shop or the bags should not come off during the transportation. However, in the case when the sealing strength is increased, upon removing the commodities-containing bags from the display strip, the surface layer of the bag might be damaged, impairing the printed face thereof to cause degradation in the commodity appearance, and in the worst state, the peeling tends to reach a place other than the sealed portion, resulting in a problem in which the bags used for maintaining the commodity quality are subjected to scratches and pores.

SUMMARY OF THE INVENTION

The objective of the present invention is to provide a display strip which can facilitate to make a process of attaching the bags thereto automate, and, enables commodity-containing bags to be removed therefrom without having their appearance degraded.

The present invention relates to a display strip for holding and aligning a plurality of commodity-containing bags vertically for the display, which comprises at least a substrate layer and a sealant layer, with the sealant layer containing an ethylene-vinyl acetate copolymer and an adhesive promoting tackifier.

In the display strip of the present invention, the surface of the commodity-containing bags may be bondable to the sealant layer by heat sealing, and when the sealant layer and the surface of the bag bonded by heat sealing are separated, the peeling is preferably taken place in the interface between the sealant layer and the surface of the bag, the peeling preferably starts applied with an initial load lower than a tensile breaking strength of the surface layer of the bag and a load corresponding to the initial load is preferably needed to be applied continuously or intermittently until the peeling is completed.

The above-mentioned ethylene-vinyl acetate copolymer preferably has a vinyl acetate content of 8 to 42 weight %. The above-mentioned adhesive promoting tackifier is preferably at least one resin selected from the group consisting of a rosin resin, a terpene resin, an aliphatic hydrocarbon resin, an alicyclic hydrocarbon resin and an aromatic hydrocarbon resin.

The above-mentioned sealant layer preferably includes 70 to 95 weight % ethylene-vinyl acetate copolymer and 5 to 30 weight % adhesive promoting tackifier. Moreover, the above-mentioned sealant layer is preferably formed on substantially all over the surface.

The above-mentioned substrate layer preferably comprises a biaxial oriented polypropylene, a biaxial oriented polyethylene terephthalate, a metal foil, a paper or a laminate thereof.

The display strip of the present invention is preferably designed so that a polyethylene layer is further formed between the substrate layer and the sealant layer. In this case, polyethylene is preferably extruded between a film, containing an ethylene-vinyl acetate copolymer and an adhesive promoting tackifier, and a biaxial oriented polyethylene terephthalate film to make the lamination, or a biaxial oriented polyethylene terephthalate film is preferably laminated on the polyethylene layer of the laminated film comprising a layer containing an ethylene-vinyl acetate copolymer and an adhesive promoting tackifier, and a polyethylene layer.

A sealant layer is preferably formed on the surface of the bag, and the sealant layer preferably comprises a heat-sealable biaxial oriented polypropylene film.

Figure 1:
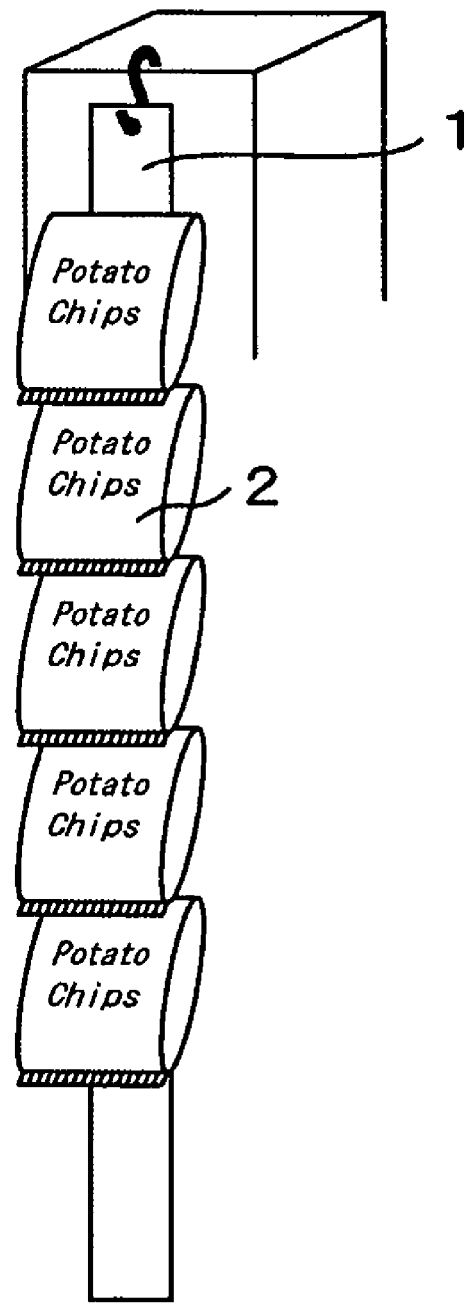
FIG. 1 is a schematic drawing that shows a strip bag display.

In the drawings, reference numeral 1 represents a display strip, 2 represents a commodity-containing bag, 3 represents a sealant layer, 4 represents a substrate layer, 5 represents a sealant layer (bag side), 6 represents a print layer (bag side), and 7 represents a sealed portion.

DETAILED DISCLOSURE OF THE INVENTION

The following description will discuss the present invention in detail.

The display strip of the present invention comprises at least a substrate layer and a sealant layer.

The above-mentioned sealant layer contains an ethylene-vinyl acetate copolymer and an adhesive promoting tackifier. The above-mentioned ethylene-vinyl acetate copolymer is a resin having a superior heat sealing property so that the surface of a commodities-containing bag is bondable to the sealant layer by a heat-sealing process. Moreover, since the heat-sealing process is carried out at a comparatively low temperature of approximately 70 to 150° C., it is possible to easily accelerate the heat sealing process, and also to sufficiently carry out the heat sealing process even in the case when the thickness of the substrate layer is increased. By increasing the thickness of the substrate layer, the entire display strip is made more elastic, and even in the case when suspending-use holes are opened by a hole punching device or the like, the strength on the periphery of each hole can be increased.

Moreover, since the above-mentioned ethylene-vinyl acetate copolymer is an elastic elastomer, even when a bag bonded by the heat sealing process is separated, the bag is not damaged as the above-mentioned sealant layer is failed.

Figure 2:
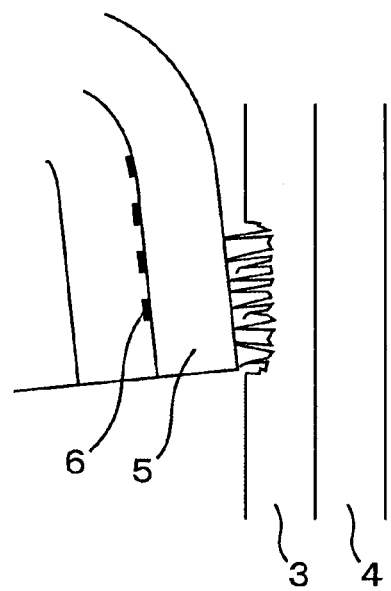
FIG. 2 is a schematic drawing that shows a state in which the bag bonded to the display strip of the present invention is being removed.
Figure 3:
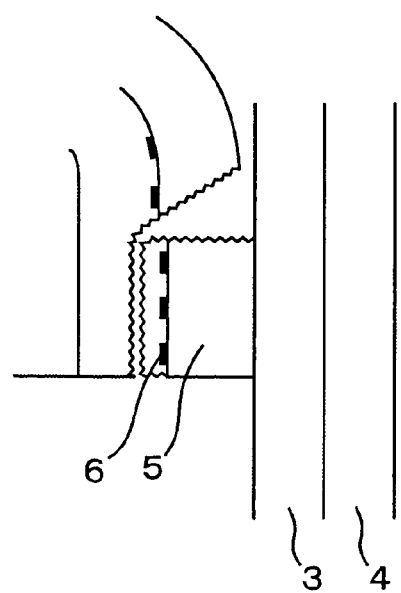
FIG. 3 is a schematic drawing that shows a state in which a bag bonded to a conventional display strip is being removed.

In the case of a conventional display strip, when a commodities-containing bag, attached to a display strip by heat sealing process, is removed from the strip, even the print layer, etc. of the bag is damaged due to an impact given at the time when cohesion failure occurs on the surface of the bag, with the result that the print surface of the bag is consequently damaged, and the damage tends to reach portions other than the sealing portion. In contrast, the display strip of the present invention has an arrangement in which the sealant layer on the display strip side is formed by a material containing an ethylene-vinyl acetate copolymer; therefore, the above-mentioned sealant layer is relatively torn more easily than the surface of the bag so that, as shown in FIG. 2, when separated, the peeling is always taken place in the interface between the sealant layer and the surface of the bag, with the sealant layer on the display strip side being stretched and torn; thus, it becomes possible to remove the commodity-containing bag from the display strip without having their appearance degraded.

In the display strip of the present invention, when the surface of the bag is separated from the sealant layer, the peeling preferably starts applied with an initial load lower than a tensile breaking strength of the surface layer of the bag and a load corresponding to the initial load is preferably needed to be applied continuously or intermittently until the peeling is completed.

Figure 5:
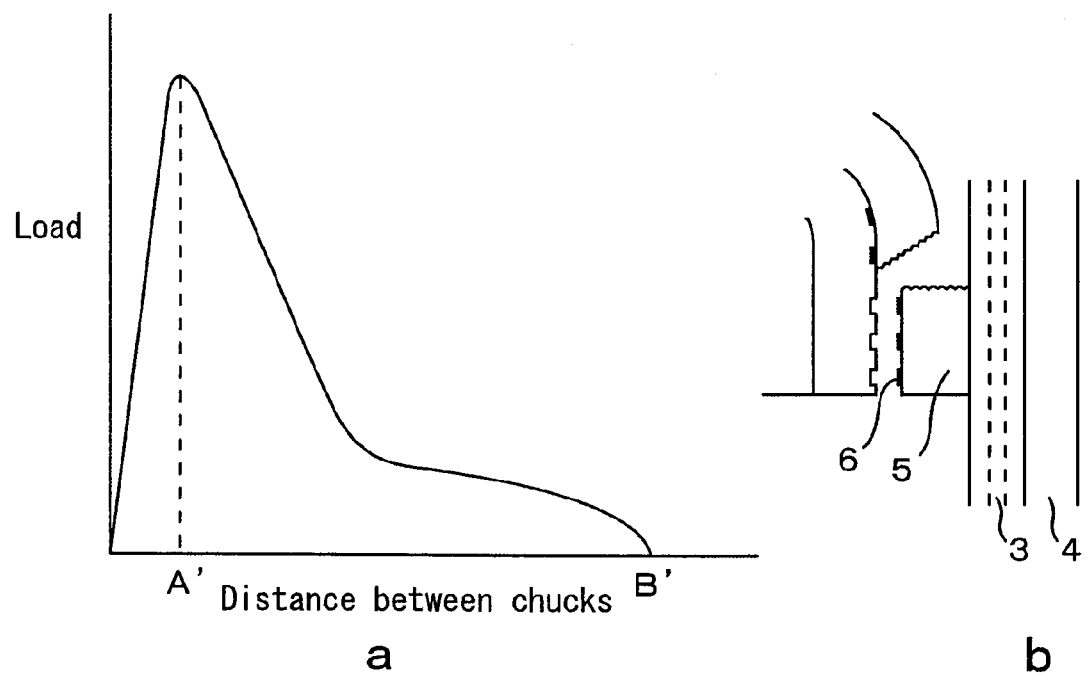
FIG. 5 is a schematic drawing that shows variations in the load that is applied to the bag bonded to the conventional display strip, when the bag is being removed.

The inventors, etc. of the present invention have analyzed cases in which the bag, bonded to the conventional display strip by heat sealing, is damaged upon peeling. Then, they have found that in many cases in which the bag is damaged, when the load that is imposed upon peeling of the display strip and the bag that are bonded to each other by heat sealing is measured, and when the resulting values are plotted with respect to the distance (distance between chucks) between the display strip and the bag, a graph having a shape shown in FIG. 5a is obtained. As shown in FIG. 5b, when, at the initial stage at peeling (distance between chucks: A'), a certain load has been reached, a crack occurs on the outermost surface of the surface layer on the bag (here, the surface layer refers to one layer on the outer surface side of the bag which is formed by 2 to 5 laminated films, and in the case when the outer bag surface side is formed by heat sealable biaxial oriented polypropylene, it refers to not only the heat sealable layer on the outermost surface but also the heat sealable biaxial oriented polypropylene layer), and the fracture proceeds toward the inner portion of the surface layer from this point; therefore, it is considered that the load drops rapidly, and the peeling is allowed to proceed to the completion of peeling (distance between chucks: B') by a very weak load.

In contrast, in a preferable mode of a display strip of the present invention, when the load that is imposed upon peeling of the display strip and the bag that are bonded to each other by heat sealing is measured, and the resulting values are plotted with respect to the distance (distance between chucks) between the display strip and the bag, for example, a graph having a shape shown in FIG. 4a or FIG. 4a' is obtained. A schematic drawing, which shows the state of peeling at this time, is shown in FIG. 4b or FIG. 4b'.

In other words, since the sealant layer contains the ethylene-vinyl acetate copolymer, a peeling is started by an initial load lower than the tensile breaking strength of the bag surface layer (distance between chucks: A) with the sealant layer being stretched. With this arrangement, since the surface layer on the bag side is free from damage, it becomes possible to remove the commodity-containing bag without having the appearance degraded. Next, it is preferable to provide an arrangement in which after the peeling has started, the load corresponding to the initial load is continuously or intermittently applied until the peeling has been completed (distance between chucks: B).

In order to allow the commodity to be easily removed from the display strip, it is necessary to allow the peeling to start even by a comparatively weak force; however, when, as in the case of the conventional display strip, the load required for the peeling drops abruptly once the peeling has started, the commodity comes off easily even when a load is instantaneously imposed thereon without intension upon transporting or displaying the commodity. In the preferable mode of the display strip of the present invention, since it is necessary to apply the load corresponding to the initial load continuously or intermittently from the start of the peeling until the peeling has been completed, it becomes possible to prevent the commodity from coming off unintentionally.

The above-mentioned arrangement can be achieved, for example, by allowing the sealant layer of the display strip of the present invention to contain an ethylene-vinyl acetate copolymer so that a peeling takes place on the interface between the surface of the bag and the sealant layer or so that a cohesion failure takes place in the sealant layer, prior to the damage of the surface of the bag; alternatively, in the case when the sealant layer is made of a plurality of layers, the interlayer bonding strength is increased so that an interlayer fracture will not occur, or even if an interlayer fracture should occur, the interlayer fracture will not progress unless a comparatively great load is given.

Here, the process in which a load corresponding to the initial load is continuously applied refers to the fact that the load required for the completion of the peeling after the application of the initial load is the same degree as the initial load; however, a slight increase or decrease from the initial load is permissible unless it takes place abruptly. Here, it is preferable to continuously apply a load within a range of ±50% with respect to the initial load. Moreover, it is preferable to allow the load required for the completion of the peeling after the application of the initial load to increase as the inter chuck distance increases (FIG. 4a).

Moreover, the process in which the load corresponding to the initial load is kept imposing intermittently refers to the state that, even if the load is greatly lowered once after the application of the initial load, the load that is again required until the completion of the peeling is allowed to greatly increase so that a peak which indicates that a load within a range of ±50% with respect to the initial load is imposed is allowed to appear (FIG. 4a').

The content of vinyl acetate in the ethylene-vinyl acetate copolymer is not particularly limited; however, it is preferably set in a range from 8 to 42 weight %. The content of less than 8 weight % tends to make the adhesive property insufficient, and the content exceeding 42 weight % tends to make the film moldability insufficient.

Moreover, with respect to the ethylene-vinyl acetate copolymer, those copolymers having one portion of the vinyl acetate component being subjected to saponification may also be used.

With respect to the ethylene-vinyl acetate copolymer, a single copolymer may be used, or two kinds or more of those having different vinyl acetate contents or the like may be used in a mixed manner.

With respect to the ethylene-vinyl acetate copolymer, a melt flow rate (MFR) is preferably in a range of 1 to 30.

When the MFR is less than 1, film formation becomes difficult since a melting viscosity is too high. When a display strip formed by using an ethylene-vinyl acetate copolymer having a MFR of more than 30 is used for displaying packaged bags by bonding them thereto, it becomes difficult to support the weight of bags depending on their filling amount in the case where temperature inside the room becomes 30° C. or more, particularly 40° C. or more. In such case, a phenomenon that the bags are dropped from the display strip is easily caused. However, even if the temperature inside a room is such high, a display strip formed with an ethylene-vinyl acetate copolymer having a MFR within the above range may effectively prevent the phenomenon mentioned above. It is more preferably in a range of 3 to 10. Incidentally, the MFR is measured according to JIS K 6730.

With respect to the above-mentioned adhesive promoting tackifier, although not particularly limited, for example, at least one resin selected from the group consisting of a rosin resin, a terpene resin, an aliphatic hydrocarbon resin, an alicyclic hydrocarbon resin and an aromatic hydrocarbon resin is preferably used.

With respect to the above-mentioned rosin resin, not particularly limited, examples thereof include rosin, a rosin derivative, a rosin ester, a gum rosin, a wood rosin, a tall oil rosin, a distilled rosin, a hydrogenated rosin, a dimer rosin, a polymerized rosin, a glycerol ester of natural rosin, a glycerol ester of modified rosin, a pentaerythritol ester of natural rosin, a pentaerythritol ester of modified rosin, a glycerol ester of hypochromic wood rosin, a glycerol ester of hydrogenated rosin, a glycerol ester of polymerized rosin, a pentaerythritol ester of hydrogenated rosin, and a phenolic modified pentaerythritol ester of rosin.

With respect to the above-mentioned terpene resin, although not particularly limited, examples thereof include a terpene, a phenolic terpene, a modified terpene, an α-pinene copolymer, a β-pinene copolymer, a dipentene polymer and a terpene-phenol copolymer.

With respect to the above-mentioned aliphatic hydrocarbon resin, although not particularly limited, examples thereof include: copolymers mainly composed of monoolefin or diolefin having 4 to 5 carbon atoms, such as 1-butene, isobutylene, butadiene and 1,3-pentadiene.

With respect to the above-mentioned alicyclic hydrocarbon resin, not particularly limited, examples thereof include: a resin obtained by polymerizing a material that is formed by subjecting a diene component in a spent C4–C5 distilled portion to a ring-forming process to be formed into a dimer, a resin obtained by polymerizing a cyclic monomer such as cyclopentadiene, hydrogenated dicyclopentadiene resin and a hydrogenated petroleum resin.

With respect to the above-mentioned aromatic hydrocarbon resin, not particularly limited, examples thereof include vinyl toluene, indene, a styrene copolymer and an α-methylstyrene copolymer.

With respect to the above-mentioned adhesive promoting tackifier, for example, commercially available resins such as those disclosed in U.S. Pat. No. 6,117,945 may be used.

The above-mentioned sealant layer preferably includes 70 to 95 weight % ethylene-vinyl acetate copolymer and 5 to 30 weight % adhesive promoting tackifier. When the content of the above-mentioned adhesive promoting tackifier is less than 5 weight %, the stickiness of the sealant layer during the fusing process tends to become insufficient, and when it exceeds 30 weight %, the moldability tends to become insufficient.

The above-mentioned sealant layer may contain a wax in order to improve the processing suitability and to adjust the stickiness strength and the like. With respect to the wax, not particularly limited, for example, various waxes, such as an olefin-based wax, a paraffin-based wax, an aliphatic ester-based wax, a deoxidation carnauba wax, a saturated aliphatic acid-based wax, an unsaturated aliphatic acid-based wax, a saturated alcohol-based wax, an aliphatic alcohol-based wax, a polyhydric alcohol-based wax, a saturated fatty acid amide-based wax, a saturated fatty acid bisamide-based wax, an unsaturated acid amide-based wax and an aromatic bisamide-based wax, may be used.

The above-mentioned sealant layer may contain normally applied additives, such as an ultraviolet-ray preventive agent, an antioxidant, a plasticizer, a lubricant, a pigment and a dye, if necessary.

The above-mentioned sealant layer may be formed on substantially all over the surface of the display strip of the present invention, may be formed with a striped pattern, or may be formed only at the predetermined position to which the commodity is attached. In the case when the sealant layer is formed on substantially all over the surface of the display strip, the commodity can be attached to desired positions of the display strip, thereby providing a desirable arrangement. In this case, the term "substantially" all over the surface refers to the state in which those positions having drilling processes and peripheral portions and the like to which no commodity is attached are excluded.

Although not particularly limited, the above-mentioned substrate layer is preferably designed to have sufficient strength since a number of commodities are attached thereto and suspended therefrom and also to have heat resistance so as not to melt and deteriorate in the heat sealing process; therefore, for example, a biaxial oriented polypropylene (OPP), a biaxial oriented polyethylene terephthalate, a metal foil, a paper and a laminated matter of these are preferably used.

Although not particularly limited, the thickness of the substrate layer is preferably set in a range of 30 to 200 μm. The thickness of less than 30 μm fails to provide sufficient strength, causing the possibility of damages to the commodity-containing bag upon displaying the bag or removing the bag, while the thickness exceeding 200 μm allows the substrate layer to serve as a heat insulating material to prevent heat from being sufficiently transmitted to the sealant layer during the heat sealing process. As described earlier, since the ethylene-vinyl acetate copolymer, contained in the sealant layer, is superior in a low-temperature heat-sealing property, it is possible to increase the flexibility of the entire display strip by increasing the thickness of the substrate layer within a range so as not to intervene with the heat sealing property, and consequently to enhance the strength on the periphery of each of holes, even when suspending-use holes are formed by using a hole punch or the like.

In the display strip of the present invention, it is preferable to further form a polyethylene layer between the substrate layer and the sealant layer. Since polyethylene is flexible and has a high tensile extensibility, the application of the polyethylene layer makes it possible to improve the entire strength of the display strip of the present invention; therefore, even in the case when holes from which the display strips are suspended are formed by punching processes (hole punches), upon removing any of the display strips, the corresponding portion is allowed to withstand a load imposed thereon. Here, the above-mentioned polyethylene layer also serves as a joining material to bond the substrate layer to the sealant layer. The laminating processes of polyethylene can be carried out by laminating layers while polyethylene is extruded between the substrate layer and the sealant layer. Additionally, besides polyethylene, an ethylene-(meth)acrylic acid copolymer or ionomer of an ethylene-(meth)acrylic acid copolymer may be used.

Moreover, the above-mentioned substrate layer and the sealant layer may be laminated with a bonding agent being interpolated between the layers by using a known dry laminating method, or these may be laminated by using a thermal laminating method in which neither a solvent nor a bonding agent is used.

Although not particularly limited, the thickness of the polyethylene layer is preferably set to 5 to 50 μm. The thickness of less than 5 μm tends to fail to improve the strength sufficiently, while the thickness exceeding 50 μm makes the thickness of the entire display strip thicker, resulting in degradation in the heat sealing property due to its heat insulating effect.

In the display strip of the present invention, another layer having another function may be further formed between the substrate layer and the sealant layer. For example, a print layer and the like may be listed as such a layer. In particular, in the case when polymer is used as the substrate layer, the print layer is preferably formed between the substrate layer and the sealant layer, and in the case when a paper is used as the substrate layer, the printing process is preferably carried out on the surface bearing no laminated the paper.

The mode of the display strip of the present invention is not particularly limited, and, for example, a tape shape, a sheet shape and the like are listed. Moreover, a punching process may be carried out to form a hole on one side end of the display strip or a clip-attaching process may be applied thereto, so as to engage a hook with the hole or clip to suspend and exhibit the display strip with commodities being attached thereto. In particular, since the punching process is easily carried out through a sequence of automated processes, this process is preferably used. However, in the case when a hole is opened in the display strip and engaged with a hook, an excessive force tends to be applied to the hole portion to cause tearing, it is preferable to strengthen the substrate layer or to prepare an arrangement in which a polyethylene layer or a nylon layer is formed between the substrate layer and the sealant layer.

With respect to the commodity-containing bag, which is attached to the display strip, any bags normally used may be applicable; and among these, those having a sealant layer on the surface are preferably used. The sealant layer of the surface of the bag is preferably formed by at least one kind of compound selected from the group consisting of polypropylene, a copolymer of propylene and another olefin, a low-density polyethylene and an ethylene-vinyl acetate copolymer. Moreover, the sealant layer on the surface of the bag is preferably made of a heat-sealable biaxial oriented polypropylene (OPH) film. The heat-sealable biaxial oriented polypropylene (OPH) film normally refers to a film having a structure in which a very thin terpolymer layer, made from a resin having a heat sealing property, such as a propylene-ethylene-butene ternary copolymer, is formed on the surface of biaxial oriented polypropylene (OPP) so as to provide a heat sealing property thereto, and this material has been widely used as a material for bags, particularly, in Europe and the United States. Here, the sealant layer on the surface of the bag is preferably designed so as not to contain the aforementioned component for cohesion failure.

With respect to the commodity-containing bag, which is attached to the display strip of the present invention, examples thereof include: a bag made from biaxial oriented polymer on its surface, such as biaxial oriented polypropylene (OPP) layer/print layer/polyethylene (PE) layer/aluminum vapor deposition polyethylene terephthalate (PET) layer/polyethylene (PE) layer/cast polypropylene (CPP) layer, and transparent vapor deposition biaxial oriented polyethylene terephthalate (PET) layer/print layer/cast polypropylene (CPP) layer; and a bag made from heat sealable biaxial oriented polypropylene (OPH) layer/print layer/polyethylene (PE) layer/aluminum vapor deposition heat sealable biaxial oriented polypropylene (OPH) layer.

With respect to the method for manufacturing the display strip of the present invention, not particularly limited, conventionally known methods may be used. For example, a method in which the substrate layer and the sealant layer, which are separately manufactured by an extrusion molding method or the like, are bonded to each other by a bonding agent may be proposed.

Moreover, the above-mentioned sealant layer may be formed by a coating method. With respect to the method for forming the sealant layer by the coating method, not particularly limited, for example, a method in which a hot melt adhesive agent containing an ethylene-vinyl acetate copolymer and an adhesive promoting tackifier is laminated on the substrate layer may be used. Here, when a biaxial oriented polyethylene terephthalate film, a biaxial oriented polypropylene film or the like is used as the substrate layer, proper to the coating process, it is preferable to carry out a pre-treatment, such as a corona treatment and an anchor coating treatment, or to preliminarily extrusion-laminate a polyethylene layer on the substrate layer.

Furthermore, when the above-mentioned polyethylene layer is formed, a method in which a film containing an ethylene-vinyl acetate copolymer and a biaxial oriented polyethylene terephthalate film are laminated while polyethylene is extruded and formed between these films, and a method in which, on the polyethylene layer side of a layered film made from a layer containing an ethylene-vinyl acetate copolymer and a polyethylene layer, a biaxial oriented polyethylene terephthalate film is laminated, are preferably adopted.

Moreover, in the case when the above-mentioned sealant layer is made of a plurality of layers including a peeling layer and a heat seal layer, a co-extrusion molding method may be used to form the layer.

Figure 6:
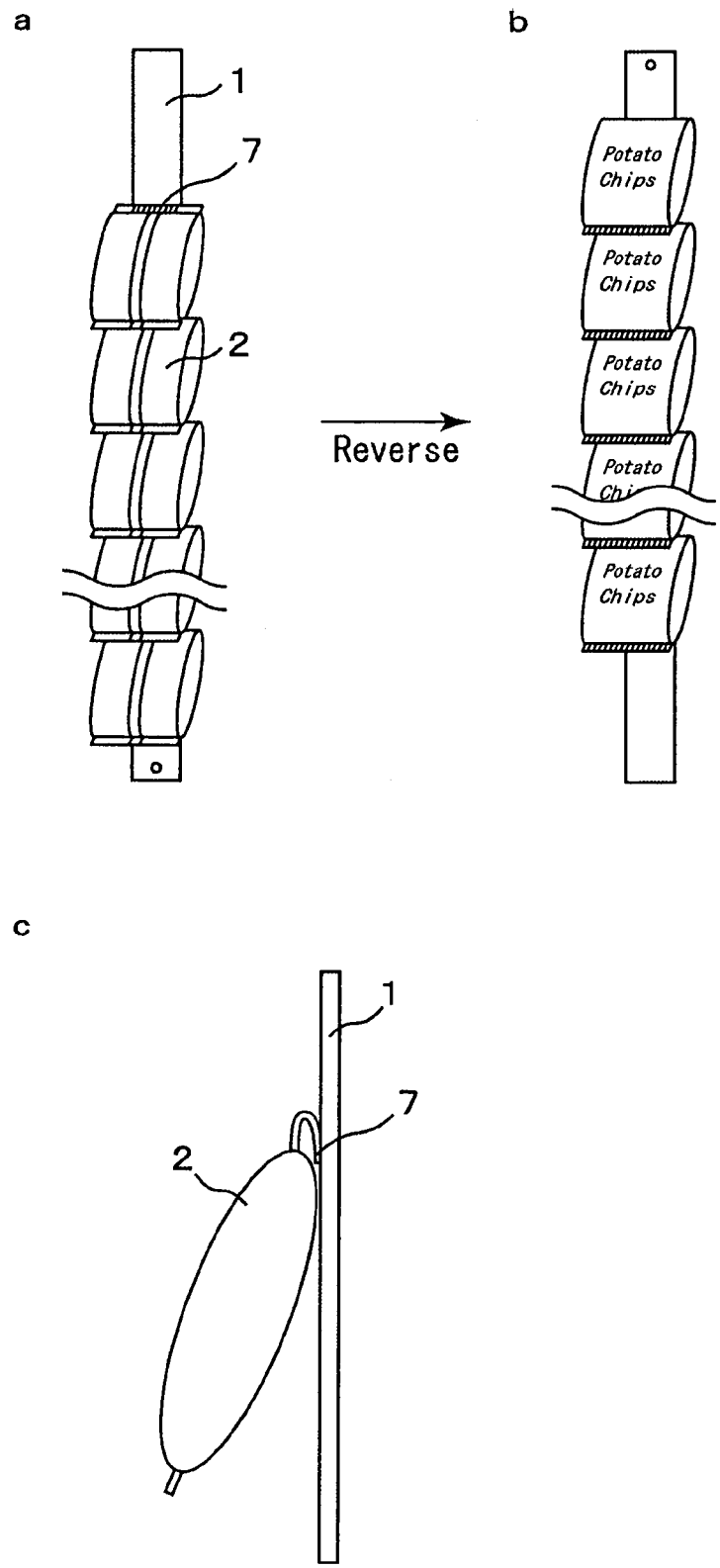
FIG. 6 is a schematic drawing that shows one example of a sequence of processes that are taken when a commodity-containing bag is attached to the display strip of the present invention.

With respect to the method for attaching commodity-containing bags to the display strip of the present invention, although not particularly limited, for example, a sequence of attaching processes as shown in FIG. 6 is preferably used. In this method, first, a commodity-containing bag is placed with the surface side of the bag being made in contact with the display strip, and the upper portion of the bag is heat-sealed so as to bond the bag to the display strip (FIG. 6a). After a predetermined number of commodity-containing bags have been bonded to the display strip, each of the commodity-containing bags is reversed upside down around the heat seal portion serving as an axis so that the surface of the bag is placed on the side opposite to the display strip (FIG. 6b). In this state, one end of the display strip is engaged with a hook or the like to be suspended from this to be displayed; thus, the bonded portion between the bag and the display strip is in a state as shown in FIG. 6c so that it is possible to easily remove the commodity-containing bag from the display strip by pulling it downward even with small force.

Although not particularly limited, the sealing strength between the bag and the display strip is preferably set to 1 to 50 N/30 mm. When the strength is less than 1 N/30 mm, the commodity-containing bag might drop by gravity depending on the weight of the commodities, while the strength exceeding 50 N/30 mm tends to make the commodity-containing bag difficult to come off even it is pulled in its suspended state. More preferably, it is set to 5 to 30 N/30 mm.

Figure 7:
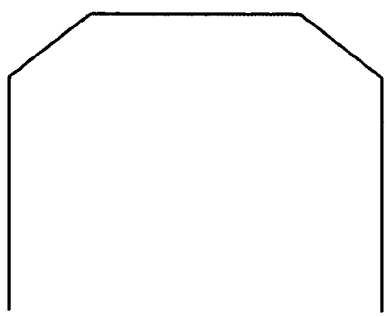
FIG. 7 is a schematic drawing that shows one example of a state of sealing jaws.
Figure 7:
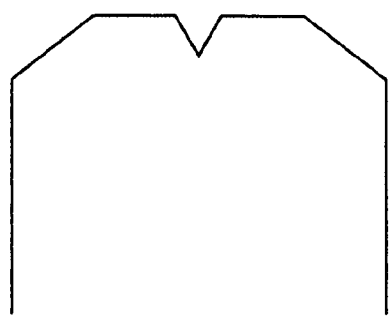

Here, with respect to the sealing state and the separating state between the bag and the display strip, these can be greatly varied depending on sealing conditions. In addition to displacements due to a temperature at the sealing time, sealing pressure and the like of the seal jaw, the sealing conditions are also varied depending on the shape of the seal jaw. With respect to the shape of the seal jaw, for example, a shape shown in FIG. 7 may be used. Therefore, it is preferable to select optimal sealing conditions depending on the adhesive component forming the sealant layer, the component for cohesion failure and the material of the surface layer of the bag of the display strip of the present invention. With respect to the width of the seal jaw, it is determined in accordance with a desired length of the bonded face between the display strip and the surface of the bag, and this length virtually determines the distance from the start of a peeling to the completion of the peeling when the bag is removed from the aforementioned display strip.

The application of the display strip of the present invention makes it possible to fix the commodity-containing bags by heat sealing, and also to easily attach a large number of commodities thereto automate. Moreover, when the commodity-containing bag is separated from the display strip, the peeling is taken place in the interface between the sealant layer and the surface of the bag, with the sealant layer on the display strip side being stretched and torn; thus, no damages are caused on the appearance of the bag.

BEST MODE FOR CARRYING OUT THE INVENTION

The present invention is more specifically described with reference to the examples below, but such examples are not intended to limit the scope of the present invention.

EXAMPLE 1

A biaxial oriented polyethylene terephthalate (PET) film having a thickness of 50 μm was used as a substrate layer, and a film (Melthene MX09, made by Tosoh Corporation), which had a thickness of 50 μm, and contained ethylene-vinyl acetate resin and an adhesive promoting tackifier, was used as a sealant layer, while allowing low-density polyethylene (LDPE) to be fused and extruded between the substrate layer and the sealant layer to form a layer having a thickness of 30 μm; thus, the substrate layer and the sealant layer were laminated to obtain a sheet having a three-layer structure of PET (50 μm)/LDPE (30 μm)/sealant layer (50 μm). The sheet thus obtained was cut to a width of 35 mm so that display strips were prepared.

EXAMPLE 2

A biaxial oriented polyethylene terephthalate (PET) film having a thickness of 50 μm was used as a substrate layer, and a film which had a thickness of 50 μm, and was made from 80 weight % of ethylene-vinyl acetate resin (content of vinyl acetate: 19 weight %) and 20 weight % of alicyclic hydrogenated petroleum resin (softening point: 125° C.; bromine number 2) was used as a sealant layer, while allowing low-density polyethylene (LDPE) to be extruded to form a layer having a thickness of 30 μm; thus, the substrate layer and the sealant layer were laminated to obtain a sheet having a three-layer structure of PET (50 μm)/LDPE (30 μm)/sealant layer (50 μm). The sheet thus obtained was cut to a width of 35 mm so that display strips were prepared.

EXAMPLE 3

A biaxial oriented polyethylene terephthalate (PET) film having a thickness of 75 μm was used as a substrate layer, and a laminated film which had a thickness of 30 µm, and was made of a sealant layer containing ethylene-vinyl acetate and an adhesive promoting tackifier, and a polyethylene layer (Melthene MX302, made by Tosoh Corporation), was laminated onto the substrate layer by using a dry laminate adhesive agent to obtain a sheet having a two-layer structure of PET (75 µm)/polyethylene-sealant layer (30 µm). The sheet thus obtained was cut to a width of 35 mm so that display strips were prepared.

COMPARATIVE EXAMPLE 1

A paper with a basis weight of 70 g/m² was used as a substrate layer, and a heat sealable biaxial oriented polypropylene film (OPH) having a thickness of 50 µm was laminated on this by an adhesive agent to obtain a sheet having a two-layer structure of paper (35 µm)/sealant layer (50 µm). The sheet thus obtained was cut to a width of 35 mm so that display strips were prepared.

Figure 4:
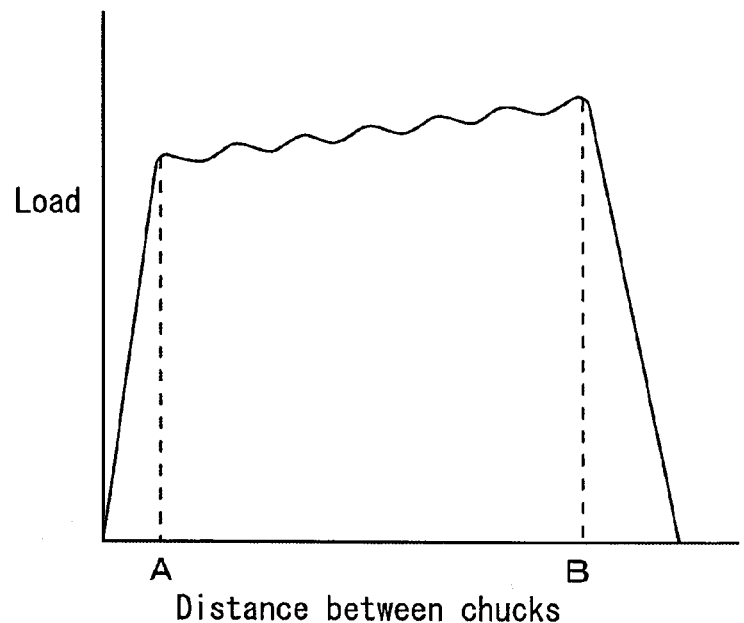
FIG. 4 is a schematic drawing that shows variations in the load that is applied to the bag bonded to the display strip of the present invention, when the bag is being removed.
Figure 4:
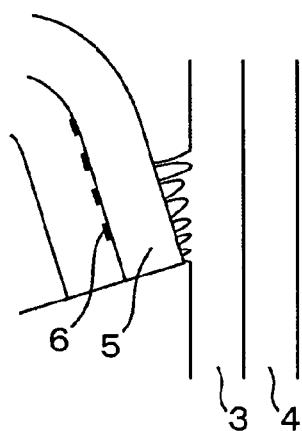
Figure 4:
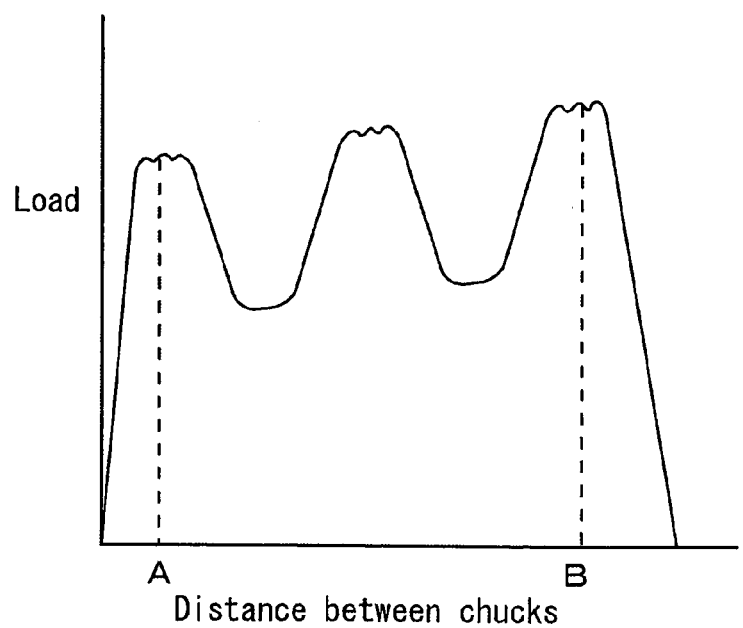
Figure 4:
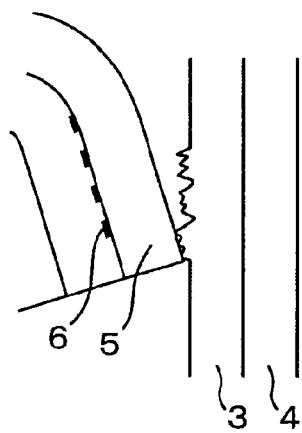

To display strips formed in examples 1 to 3 and comparative example 1 were attached bags, each containing snack cookies, by using a sequence of processes shown in FIG. 4. The heat sealing conditions were set to 130° C. and 200 ms with respect to examples. However, with respect to the display strip of comparative example 1, since these conditions failed to carry out the bonding operation, the heat sealing process was carried out at 190° C. for 200 ms. Moreover, the bag having the following structure was used.

Bag structure: heat sealable biaxial oriented polypropylene (OPH) layer (20 µm)/print layer/polyethylene (PE) layer (10 µm)/aluminum vapor deposition heat sealable biaxial oriented polypropylene (OPH) layer (20 µm).

The sealing strength between each display strip and each bag was measured at a tensile speed of 300 mm/min by using a tension tester (Strograph V1-C made by Toyo Seiki Seisaku-sho, Ltd.)

Moreover, with respect to every ten display strips, after bags had been bonded thereto, each bag was pulled downward to be separated with each display strip being suspended, and the portion of each bag that had been heat-sealed was visually observed, and the number of the bags having problems with the external appearance thereof, such as damaged print layer, was counted.

Table 1 shows the results of these tests.

TABLE 1

|  | Sealing strength (N/30 mm) | Number of bags with damaged external appearance |
| --- | --- | --- |
| Example 1 | 18.99 | 0 |
| Example 2 | 24.06 | 0 |
| Example 3 | 12.80 | 0 |
| Comparative Example 1 | 6.65 | 8 |

Table 1 shows that the application of display strips formed in examples 1 to 3 makes it possible to bond the bag with higher sealing strength in comparison with the display strips formed in comparative example 1, and also to separate the bag without causing damages thereto.

Moreover, display strips, formed in example 1, were used, and bags were continuously attached to each of these by using a Strip bag Applicator disclosed in Japanese Patent Application No. 2002-251846 filed by Ishida Co., Ltd. In this case, the sealing conditions were set to 105° C. and 275 msec, and two seal jaws each having a width of 30 mm and a length of 2 mm, shown in FIG. 7b, were used.

The resulting samples were measured to find the displacement in load imposed on the seal portion by using a tension tester (Strograph V1-C made by Toyo Seiki Seisaku-sho, Ltd.) at a tensile speed of 300 mm/min.

Figure 8:
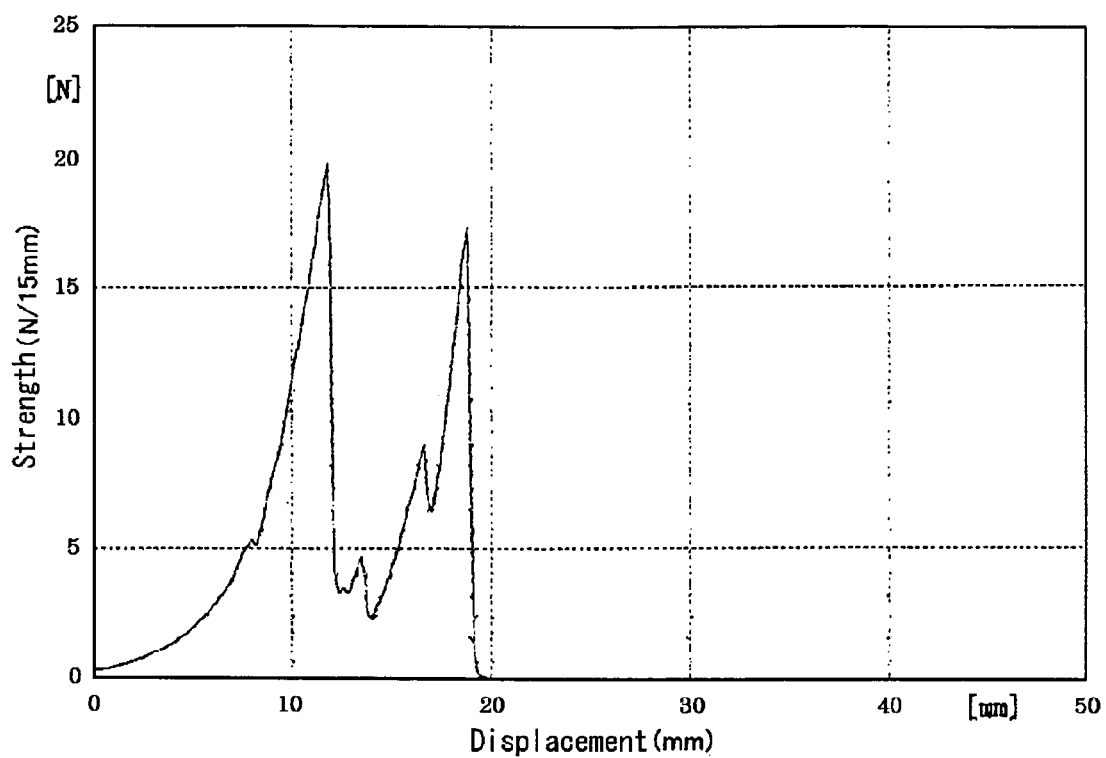
FIG. 8 is a drawing that shows displacements in the load that is applied to the bag bonded to the display strip formed in example 1, when the bag is being removed from this.

FIG. 8 shows the results of the tests.

In FIG. 8, a strong peak appears at a portion with which the seal jaw was assumingly made in contact. In this manner, the curve that indicates the displacement in load is also influenced by the shape of the seal jaw. Moreover, the second peak is located within a range of ±50% of the load in comparison with that of the first peak.

EXAMPLE 4

A laminated layer, made from a low density polyethylene having a thickness of 20 µm, is formed on a biaxial oriented polyethylene terephthalate (PET) film having a thickness of 50 µm by a melt extrusion laminating method. After a corona treatment have been applied to this laminated layer, the layer is coated with an EVA-based hot-melt agent (7500 Series 7571, made by Hirodine Corp.) preliminarily heated to 230° C. so as to have a thickness of 30 µm to form a sealant layer. The resulting sheet is cut to a width of 35 mm so that display strips are prepared.

EXAMPLE 5

A biaxial oriented polyethylene terephthalate (PET) film having a thickness of 50 µm is used as a substrate layer, and resin pellets (Melthene MX06, made by Tosoh Corporation) containing ethylene-vinyl acetate resin and an adhesive promoting tackifier and low-density polyethylene (LDPE) resin pellets are extruded into two layers by using a tandem laminator to obtain a sheet having a three-layer structure of PET (50 µm)/LDPE (30 µm)/sealant layer (30 µm). The sheet thus obtained is cut to a width of 35 mm so that display strips are prepared.

EXAMPLE 6

A paper with a basis weight of 100 g/m² is used as a substrate layer, and on this is melt-extruded pellets (Melthene MX06, made by Tosoh Corporation) containing ethylene-vinyl acetate resin and an adhesive promoting tackifier to form a sealant layer having a thickness of 50 µm; thus, a sheet having a two-layer structure of paper (50 µm)/sealant layer (50 µm) is obtained. The sheet thus obtained is cut to a width of 35 mm so that display strips are prepared.

EXAMPLE 7

One surface of a biaxial oriented polyethylene terephthalate (PET) film having a thickness of 50 µm is subjected to a corona treatment, and an anchor coat agent (made by Dainichiseika Color & Chemicals Mfg. Co., Ltd.; mixed solution having solvents 2710A and 2710B at a ratio of 1:2) is applied onto the corona-treated face so as to have a concentration of 1 g/m², and dried thereon. Further, this anchor coat layer is coated with a hot-melt agent (Elphan OH, made by Nihon Matai Co., Ltd.) to form a thickness of 40 µm so that a sealant layer is formed. The sheet thus obtained is cut to a width of 35 mm so that display strips are prepared.

EXAMPLE 8

A biaxial oriented polyethylene terephthalate film (thickness: 50 μm) and an ethylene-vinyl acetate resin film containing an adhesive promoting tackifier (thickness: 50 μm) (Melthene MX-40, MFR 9.5, made by Tosoh Corporation) were subjected to extrusion laminating while allowing low-density polyethylene (LDPE) to be extruded between the both films to form a layer having a thickness of 30 μm. Thus, display strips consisting of three layers of PET/PE/EVA were formed which comprises PET as a substrate layer and EVA as a sealant layer.

EXAMPLE 9

Display strips consisting of three layers of PET/PE/EVA were formed in the same manner as Example 8 except that an ethylene-vinyl acetate resin film containing an ethylene-vinyl acetate resin with a MFR of 46 and an adhesive promoting tackifier (thickness: 50 μm) (MX106, made by Tosoh Corporation) was used instead of the ethylene-vinyl acetate resin film used in Example 8.

To each of the display strips formed in Examples 8 and 9, six packaged bags containing 100 g of potato chips (a laminated film comprising a layer composition of: heat-sealable OPP 20 μm/LDPE 13 μm/aluminum vapor-deposited heat-sealable OPP 20 μm) were bonded while spacing 100 mm between the bags. The device disclosed in Japanese Patent Application No.2002-251846 was used for bonding the bags to the display strip.

Bonding conditions were as follows; sealing temperature of 120° C., sealing pressure of 3 kg/cm², and a sealing time of 250 msec.

After bonding, the display strips to which bags were bonded were left for 24 hours, and were hanged in a thermostatic chamber in which the temperature is controlled to be at 40° C. The condition was observed after the lapse of 24 hours, 48 hours and 72 hours, and the number of bags dropped from the display strip was counted. Table 2 shows the results.

Incidentally, as for any of the samples, when the bags were pulled from the display strip by a hand, the bags could be removed without causing damage to the bag surfaces attached to the display strip.

TABLE 2

|  | Number of bags dropped | | |
| --- | --- | --- | --- |
|  | 24 hours later | 48 hours later | 72 hours later |
| Example 8 | 0/6 | 0/6 | 0/6 |
| Example 9 | 0 | 2 | 6 |

From Table 2, it can be said that when the ethylene-vinyl acetate resin with a MFR of 30 or less is used for forming a sealant layer of a display strip, bags may be well-bonded thereto and held even under a condition of high temperature.

INDUSTRIAL APPLICABILITY

The present invention relates to a display strip to hold commodity-containing bags. It can facilitate to make a process of attaching the bags thereto automate. It enables commodity-containing bags to be removed therefrom without having their appearance degraded.

The invention claimed is:

1. A display strip for holding and aligning a plurality of commodity-containing bags for display, each bag having an outer surface, the display strip comprising:
   at least a substrate layer and a sealant layer, with the sealant layer containing an ethylene-vinyl acetate copolymer and an adhesive promoting tackifier,
   wherein the sealant layer is torn more easily than the outer surface of the bags.

2. The display strip according to claim 1,
   wherein the surface of the commodity-containing bags is bondable to the sealant layer by heat sealing.

3. The display strip according to claim 1 or 2,
   wherein when the surface of the bag is separated from the sealant layer, the peeling is taken place in the interface between the sealant layer and the surface of the bag, the peeling starting applied with an initial load lower than a tensile breaking strength of the surface layer of the bag and a load corresponding to the initial load being needed to be applied continuously or intermittently until the peeling is completed.

4. The display strip according to claim 1, wherein the outer surface of the commodity-containing bag is bondable to the sealant layer; and when a bag bound to the sealant layer is separated from it, a peeling takes place in an interface between the surface of the bag and the sealant layer.

5. A display strip releasably holding and aligning a plurality of commodity-containing bags for display, the display strip comprising:
   a substrate layer;
   a sealant layer comprising an ethylene-vinyl acetate copolymer and an adhesive promoting tackifier; and
   a polyethylene layer formed between the substrate layer and the sealant layer.

6. The display strip according to claim 5,
   wherein the polyethylene layer is extruded and laminated between the sealant layer and the substrate layer, wherein the substrate layer comprises a biaxial oriented polyethylene terephthalate film.

7. The display strip according to claim 5,
   wherein a biaxial oriented polyethylene terephthalate film is laminated on a laminated film comprising the polyethylene layer and the sealant layer.

8. A display strip for holding and aligning a plurality of commodity-containing bags for display, the display strip comprising:
   a substrate layer and a sealant layer, with the sealant layer containing an ethylene-vinyl acetate copolymer and an adhesive promoting tackifier,
   wherein a melt flow rate (MFR) of the ethylene-vinyl acetate copolymer is in a range from about 1 to about 30, and
   wherein a second sealant layer is formed on the surface of the bag.

9. The display strip of claim 8, wherein the display strip holds the bags at temperatures above 30° C.

10. A display strip for holding and aligning a plurality of commodity-containing bags for display, each bag having an outer surface, the display strip comprising:
    a substrate layer and a sealant layer, with the sealant layer containing an ethylene-vinyl acetate copolymer and an adhesive promoting tackifier,
    wherein the display strip provides enough bonding strength with the bags to hold them during transporting and displaying but allows removing of the bags without damaging their outer surface.

11. The display strip according to claim 1, 5, or 10, wherein a second sealant layer is formed on the surface of the bag.

12. The display strip according to claim 11, wherein the second sealant layer comprises a heat-sealable biaxial oriented polypropylene film.

13. The display strip according to claim 1, 5, or 10, wherein a melt flow rate (MFR) of the ethylene-vinyl acetate copolymer is in a range from about 1 to about 30.

14. The display strip according to claim 1, 5, 8 or 10, wherein the ethylene-vinyl acetate copolymer has a vinyl acetate content of 8 to 42 weight %.

15. The display strip according to claim 1, 5, 8, or 10, wherein the adhesive promoting tackifier is at least one resin selected from the group consisting of a rosin resin, a terpene resin, an aliphatic hydrocarbon resin, an alicyclic hydrocarbon resin and an aromatic hydrocarbon resin.

16. The display strip according to claim 1, 5, 8, or 10, wherein the sealant layer includes 70 to 95 weight % ethylene-vinyl acetate copolymer and 5 to 30 weight % adhesive promoting tackifier.

17. The display strip according to claim 1, 5, 8, or 10, wherein the sealant layer is formed substantially all over the surface of the display strip.

18. The display strip according to claim 1, 5, 8, or 10, wherein the substrate layer comprises a biaxial oriented polypropylene, a biaxial oriented polyethylene terephthalate, a metal foil, a paper or a laminate thereof.

19. The display strip of claim 1, 5, 8 or 10, wherein a sealing strength between the bag and the display strip is from about 1 N/30 mm to about 50 N/30 mm.

20. The display strip of claim 19, wherein the sealing strength is from about 5 N/30 mm to about 30 N/13 mm.

* * * * *